US009329679B1

(12) United States Patent
Shepard et al.

(10) Patent No.: US 9,329,679 B1
(45) Date of Patent: May 3, 2016

(54) PROJECTION SYSTEM WITH MULTI-SURFACE PROJECTION SCREEN

(75) Inventors: Deborah M. Shepard, Portola Valley, CA (US); Menashe Haskin, Palo Alto, CA (US); James Samuel Bowen, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 13/593,270

(22) Filed: Aug. 23, 2012

(51) Int. Cl.
| G06F 3/01 | (2006.01) |
| G09G 3/00 | (2006.01) |
| G06F 3/14 | (2006.01) |
| G06F 1/16 | (2006.01) |
| G06F 3/042 | (2006.01) |

(52) U.S. Cl.
CPC ............ G06F 3/011 (2013.01); G06F 1/1637 (2013.01); G06F 1/1639 (2013.01); G06F 1/1645 (2013.01); G06F 3/0425 (2013.01); G06F 3/1423 (2013.01); G06F 3/1431 (2013.01); G09G 3/00 (2013.01); G09G 3/001 (2013.01); G09G 3/002 (2013.01); G09G 2300/02 (2013.01); G09G 2300/023 (2013.01); G09G 2310/02 (2013.01)

(58) Field of Classification Search
CPC ..... G06F 3/011; G06F 3/1423; G06F 3/1431; G06F 1/1637; G06F 1/1639; G06F 1/1645; G06F 3/0425; G09G 3/00–3/002; G09G 2300/02; G09G 2300/023; G09G 2310/02
USPC .............................. 345/5, 156–184, 1.1–1.3, 4
See application file for complete search history.

(56) References Cited

U.S. PATENT DOCUMENTS

| 6,243,074 | B1 * | 6/2001 | Fishkin et al. ................ 345/156 |
| 6,243,075 | B1 * | 6/2001 | Fishkin et al. ................ 345/156 |
| 6,268,857 | B1 * | 7/2001 | Fishkin et al. ................ 715/863 |
| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 7,782,274 | B2 * | 8/2010 | Manning ........................ 345/1.3 |
| 8,228,315 | B1 * | 7/2012 | Starner et al. ................. 345/175 |
| 8,408,720 | B2 * | 4/2013 | Nishigaki et al. ............... 353/94 |
| 8,456,466 | B1 * | 6/2013 | Reisman et al. .............. 345/419 |
| 8,462,148 | B1 * | 6/2013 | Reisman et al. .............. 345/419 |
| 8,508,433 | B2 * | 8/2013 | Manning ........................ 345/1.3 |
| 8,669,918 | B2 * | 3/2014 | Manning ........................ 345/1.3 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Dmitriy Bolotin
(74) *Attorney, Agent, or Firm* — Lee & Hayes, PLLC

(57) ABSTRACT

A projection and camera system projects content onto a passive, multi-surface projection screen. When a first surface of the screen is oriented to receive the projected images, the system detects this first surface and projects content associated with that surface of the screen. When a second surface is oriented to receive the projected images, the system detects this change from the first surface to the second surface and projects different content associated with the second surface. In this manner, to switch between different content or different applications, the user merely needs to turn the screen over.

28 Claims, 11 Drawing Sheets

(56) References Cited

U.S. PATENT DOCUMENTS

| | | | |
|---|---|---|---|
| 2003/0071832 A1* | 4/2003 | Branson | 345/698 |
| 2004/0212588 A1* | 10/2004 | Moriyama | 345/156 |
| 2004/0212602 A1* | 10/2004 | Nako et al. | 345/173 |
| 2005/0012721 A1* | 1/2005 | Fong et al. | 345/170 |
| 2005/0235215 A1* | 10/2005 | Dunn et al. | 715/740 |
| 2007/0279315 A1* | 12/2007 | Laves et al. | 345/1.1 |
| 2007/0285341 A1* | 12/2007 | Manning | 345/1.3 |
| 2010/0066685 A1* | 3/2010 | Cain et al. | 345/173 |
| 2010/0199232 A1* | 8/2010 | Mistry et al. | 715/863 |
| 2010/0207844 A1* | 8/2010 | Manning | 345/1.3 |
| 2011/0109543 A1* | 5/2011 | Das et al. | 345/156 |
| 2011/0154249 A1* | 6/2011 | Jang et al. | 715/781 |
| 2011/0241973 A1* | 10/2011 | Manning | 345/1.3 |
| 2011/0241974 A1* | 10/2011 | Manning | 345/1.3 |
| 2011/0248913 A1* | 10/2011 | Willis et al. | 345/156 |
| 2011/0298762 A1* | 12/2011 | Lin | 345/204 |
| 2012/0069180 A1* | 3/2012 | Kawamura | 348/143 |
| 2012/0112994 A1* | 5/2012 | Vertegaal et al. | 345/156 |
| 2012/0223885 A1 | 9/2012 | Perez | |
| 2012/0304053 A1* | 11/2012 | Yamaguchi | 715/251 |
| 2013/0050206 A1* | 2/2013 | Willis et al. | 345/419 |
| 2013/0063646 A1* | 3/2013 | Ueno et al. | 348/333.1 |
| 2013/0234826 A1* | 9/2013 | Sekiguchi et al. | 340/5.53 |
| 2013/0300637 A1* | 11/2013 | Smits et al. | 345/8 |
| 2013/0307956 A1* | 11/2013 | Hyde et al. | 348/78 |
| 2014/0039674 A1* | 2/2014 | Motoyama et al. | 700/245 |
| 2014/0049450 A1* | 2/2014 | Manning | 345/1.3 |

* cited by examiner

PROJECTION SYSTEM WITH MULTI-SURFACE PROJECTION SCREEN

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

As augmented reality systems continue to advance, there is a continuing need for improved ways for such systems to interact in useful ways with users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
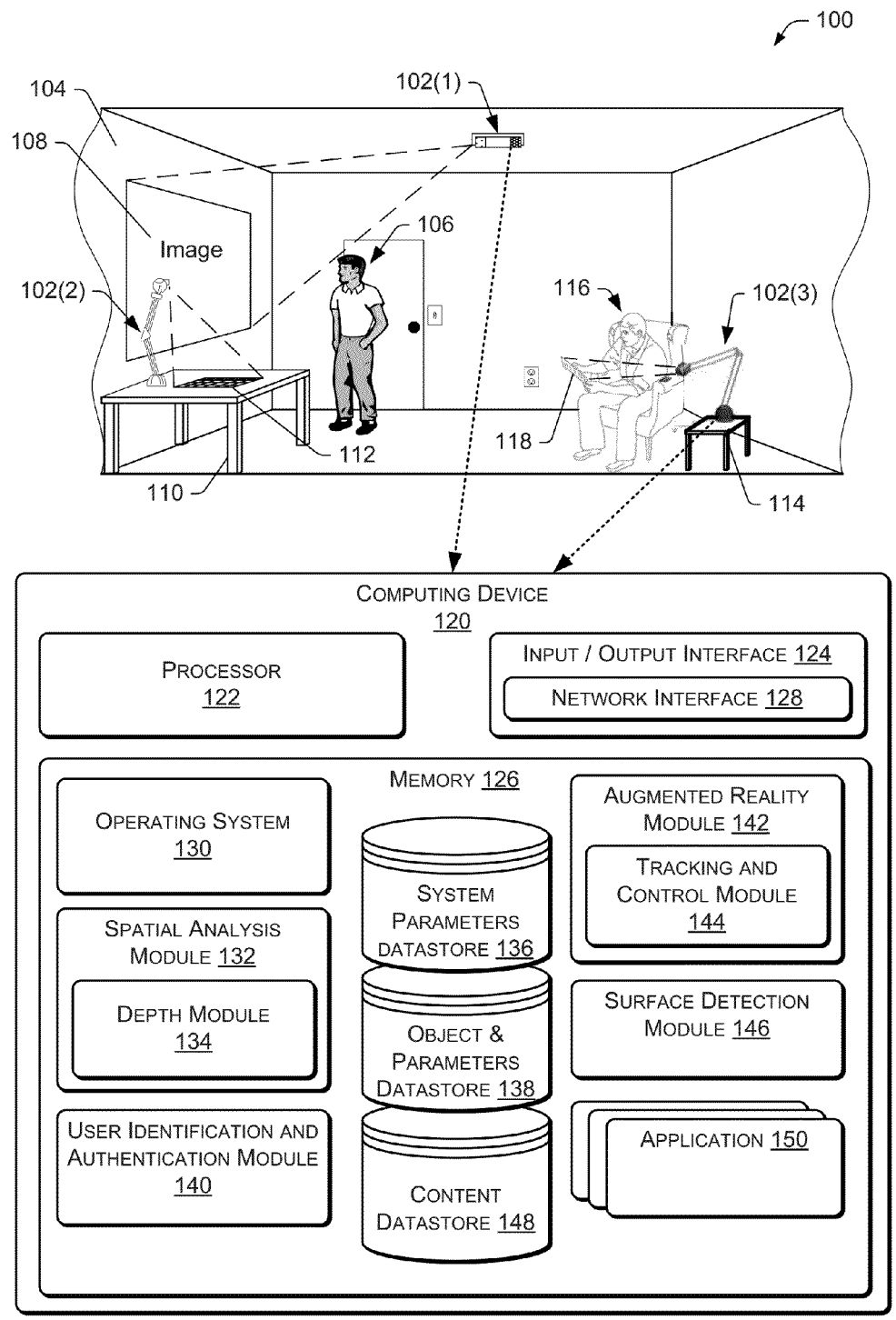
FIG. 1 shows an illustrative scene with an augmented reality environment hosted in an area, such as a room. The augmented reality environment is provided, in part, by three projection and image capture systems.

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment in which a projection and camera system projects content onto a multi-surface passive projection screen. As the user holds the screen to expose a first side or surface, the system projects subject matter associated with that surface, such as some type of content or a software application. For instance, the system may project content from an electronic book (or "eBook") or an application such as a browser or other type of navigation user interface.

If the user flips the projection screen to expose a second side or surface, the system projects different subject matter associated with the second surface, such as different content or another application. For instance, the system may project a cover image or a table of contents associated with the eBook, or another application such as a spreadsheet application. If the projection screen has more than two surfaces, the system may project still other content or applications on the other surfaces. Flipping the projection screen back to the first surface returns the user to the original content or first application associated with that surface, thereby restoring the display presentation and location to the point when the projection screen was flipped over originally. In this manner, the user may employ a passive projection screen to maintain multiple presentation contexts (e.g., different content, different applications, different windows of same application, etc.) and switch among them by changing which surface is exposed to the projection system.

In some implementations, the act of repeatedly turning the projection screen over and over in a particular direction is interpreted by the system to change the presentation images in a sequence. For instance, the user may flip the projection screen over and over to turn pages of an electronic book, or cycle through multiple applications, or toggle through graphical windows of a single application.

The projection and camera system may detect the screen movement in any number of ways. In one approach, the camera captures images of the environment and analyzes the images to determine when the user turns the screen over. In some cases, the screen surfaces may have different features, such as shape, color, type of surface, finish, and so forth. In another approach, the system may optically identify a registration mark on the surfaces of the screen. In still another approach, the screen may be equipped with a sensor or electronic tag that may be used by the system to sense position and which side is facing the projector.

The architecture may be implemented in many ways. One illustrative implementation is described below in which an augmented reality environment is created within a room. The architecture includes one or more projection and camera systems. Multiple implementations of various projection and camera systems are described. For instance, in one implementation, the projection and camera system is implemented to resemble a table lamp. However, the various implementations of the architecture described herein are merely representative.

Illustrative Environment

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains at least a projector, a camera, and computing resources that are used to generate the augmented reality environment 100.

In this illustration, the first ARFN 102(1) is a fixed mount system that may be mounted within the room, such as to the ceiling, although other placements are possible. The first ARFN 102(1) projects images into the environment, such as onto a surface 104 on a wall of the room. A user 106 is shown watching the image 108 being projected onto the wall. The ARFN 102(1) includes a projector and an associated camera mounted on a common chassis. The projector projects images onto the wall (or a screen on the wall) of the room. The user 106 may watch and interact with the images being projected onto the wall 104, and the camera of the ceiling-mounted ARFN 102(1) may capture that interaction. One implementation of the first ARFN 102(1) is provided below in more detail with reference to FIGS. 2 and 3.

A second ARFN 102(2) is embodied to resemble a common table lamp, which is shown sitting on a desk 110. The second ARFN 102(2) projects images 112 onto the surface of the desk 110 to consume and/or interact.

A third ARFN 102(2), also embodied to resemble a table lamp, is shown sitting on a small table 114 next to a chair. A second user 116 is seated in the chair and is holding a portable projection screen 118. The third ARFN 102(2) is equipped with a projector and a camera within the head of the lamp structure. The projector projects images onto a surface of the portable screen 118. The projected images may be of any number of things, such as content (e.g., books, games, news, magazines, movies, etc.) and applications (e.g., email, productivity programs, browser-based applications, etc.).

The portable screen 118 may be essentially any device for use within an augmented reality environment, and may be provided in several form factors. In the implementations described herein, the screen 118 is an entirely passive, handheld, non-electronic device. In such implementations, the passive screen 118 may be embodied with different types of reflective surfaces, including individual features that may receive projected images from an off angle direction and redirect the projected images back along a path that is near normal to the surface of the screen. In other implementations, the screen 118 may be equipped with minimal electronics such as an RFID for identification and registration, and/or an accelerometer for orientation information. In still other implementations, the screen 118 may include increasing complex electronics including processors, memory, and audio input/output. One implementation of the second and third ARFNs 102(2) and 102(3) is provided below in more detail with reference to FIG. 4.

The projection screen 118 is constructed with multiple surfaces for receiving projected images. In FIG. 1, the projection screen 118 has two primary surfaces, a first or front surface and a second or back surface. In other implementations, the projection screen may be constructed with three or more surfaces.

The ARFN 102(3) projects first images onto a first surface of the projection screen 118 when the user 116 orients the screen 118 to expose the first surface to the projector. The first images, when projected and rendered on the screen 118, may present subject matter logically associated with the surface, such as one portion of content (e.g., portions of an electronic book, segments of a movie or video clip, a level in a game, etc.), a type of content (e.g., video, text, images), an application (e.g., productivity applications, browsers, etc.), or a graphical window within an application. When the user 116 turns the screen 118 over to expose the second surface, the ARFN 102(3) detects this reorientation and projects second images onto the second surface. The second images, when projected and rendered on the screen 118, may present different subject matter logically associated with the surface, such as another portion of content (e.g., different portion of the electronic book, different segment of a movie or video clip, a level in a game, etc.), a different type of content, a different application, or a different graphical window within the same application. Representative user scenarios are described below in more detail with reference to FIGS. 5-9.

With continuing reference to FIG. 1, associated with each ARFN 102(1)-(3) or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. It may be further configured with a user interface (UI) to facilitate interaction with the user, such as voice instruction, gesture recognition or motion via the cameras, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

In some implementations, the spatial analysis module 132 may include a depth module 134 to measure the distance to various objects in the environment. In some cases, the depth module may utilize time of flight for an infrared (IR) signal (or other modulated light output). The time-of-flight value may be derived as a function of a time lapse between emission of the IR light and capture of the IR light scattered by the environment. Alternatively, the time-of-flight value may be derived as a function of the phase difference between the modulated light output and the returned light.

A system parameters datastore 136 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object and parameters datastore 138 in the memory 126 is configured to maintain information about the state of objects within the environment and a library of pre-loaded reference objects. The object parameters may include the surface contour of the object, overall reflectivity, color, and so forth. This information may be acquired from the ARFN, other input devices, or via manual input and stored within the object parameters datastore 138. The library of pre-loaded reference objects may include assumptions about the object, dimensions, and so forth. For example, the datastore 138 may include a reference object of a beverage can and include the assumptions that beverage cans are either held by a user or sit on a surface, and are not present on walls or ceilings.

The spatial analysis module 132 may use this data maintained in the datastore 138 to test dimensional assumptions when determining the dimensions of objects within the scene. For example, objects in the scene which are temporally persistent, such as walls, a particular table, particular users, and so forth may be stored within the object datastore 138. The object datastore 138 may be stored on one or more of the memory of the ARFNs, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

With user identification, the ARFNs can better interact and tailor content for the particular user. For instance, in response to a request from one user, the ARFN may select content or an application suitable for that user. Alternatively, a request from another user may result in the ARFN selecting different content or applications suitable for the other user. User preferences and profiles may be stored in one of the datastores.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items. In particular, the tracking and control module 144 is configured to track the portable projection screen 118 as the user 116 holds and moves the screen. The tracking and control module 144 may track orientation, tilt, and position of the screen 118 as the user handles the screen 118.

A surface detection module 146 is also stored in the memory 126 and configured to determine whether the first surface or the second surface of the projection screen 118 is oriented to receive the images projected thereon from the ARFN 102(3). The surface detection module 146 may receive optical imaging data taken by the camera of the environment and use that data to determine which surface of the screen 118 the user is currently engaging. If the user turns the screen 118 over, the camera captures this movement in the optical imaging data, and the surface detection module 146 interprets this activity as the user wanting to change the images being projected thereon. Any number of indicia may be used to aid in the optical detection of surfaces. For instance, the camera of the ARFN 102 may optically detect different features on the surfaces, such as color, surface type, registration marks, shape, finish, and so forth.

In other implementations, the screen 118 may be equipped with an electronic component to provide data indicative of position or orientation, such as an accelerometer. An RFID (radio frequency identification) component may also be included to assist with distinguishing between surfaces. In such implementations, the surface detection module 146 may communicate with, or receive the data from, the electronic component in the screen 118 to determine which surface is exposed to the projector.

The computing device 120 directs the projector to project different images depending upon which surface of the screen 118 is exposed. The images, when projected onto the screen, may comprise essentially any type of subject matter including various forms of content and applications. Content is stored in a content datastore 148 or in remote location (not shown) that is accessible by the computing device 120. The content may be any type of electronic renderable content, such as text, audio, images, and video. Example content may include electronic books, music, movies, games, and so on. Also, one or more applications 150 may be stored on the computer 120 or on an accessible remote location. As the applications are executed by the processor 120, various user interfaces and/or computed results of the applications may be projected by the projector onto the screen.

Accordingly, as one example, the user 116 may read a segment of an eBook on one side of the screen 118 and then turn the screen over to see the table of contents for the eBook, or a corresponding movie clip of the eBook segment. In another example, the user 116 may be viewing a weather application on one side of the screen 118, and then turn over the screen 118 to view email on the second side. Other representative examples are provided below.

The ARFNs 102 and computing components of device 120 that have been described thus far may be operated to create an augmented reality environment in which a passive handheld screen may be used to provide multiple user contexts simply by turning different surfaces of the screen toward the ARFN. The users' movements, voice commands, and other interactions are captured by the ARFNs 102 to facilitate user input to the environment.

Representative ARFN Implementations

Before describing various representative scenarios in which the ARFNs work together with the passive projection screen to present multiple different subject matter on different surfaces, the ARFNs 102(1)-(3) are described in more detail. These ARFNs provide the projection and imaging functionality to facilitate multi-surface presentation.

Figure 2:
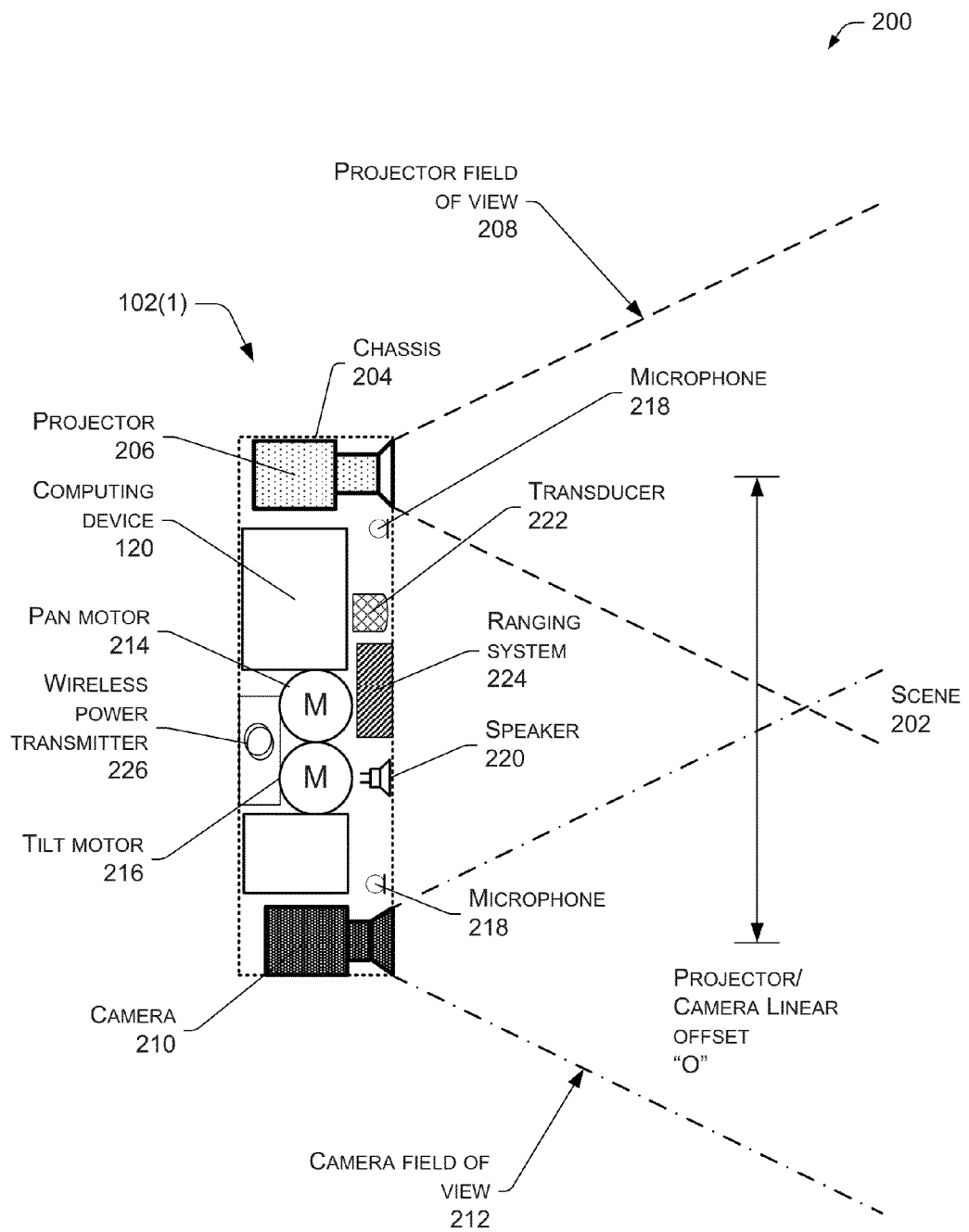
FIG. 2 shows a first implementation of a projection and image capture system formed as an augmented reality functional node having a chassis to hold a projector and camera in spaced relation to one another. In this implementation, the projector and camera have different optical paths.

FIG. 2 shows an illustrative schematic 200 of the first augmented reality functional node 102(1) and selected components. The first ARFN 102(1) is configured to scan at least a portion of a scene 202 and the objects within the environment 100. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
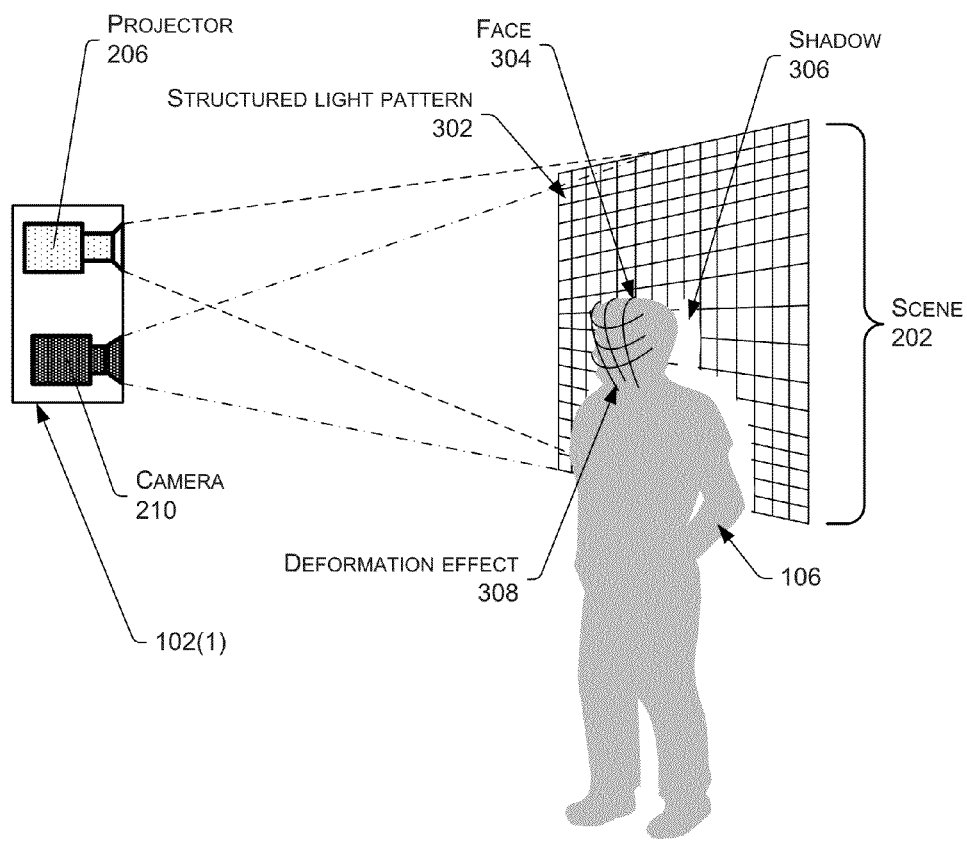
FIG. 3 illustrates one example implementation of creating an augmented reality environment by projecting structured light on a scene in the environment and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector and camera to share a common optical path. In this design, the form factor may be reduced. In the example shown in FIG. 1, the ARFNs 102(2) and 102(3) are embodied as common table lamps, where the projector and camera reside in a head of the lamp.

Figure 4:
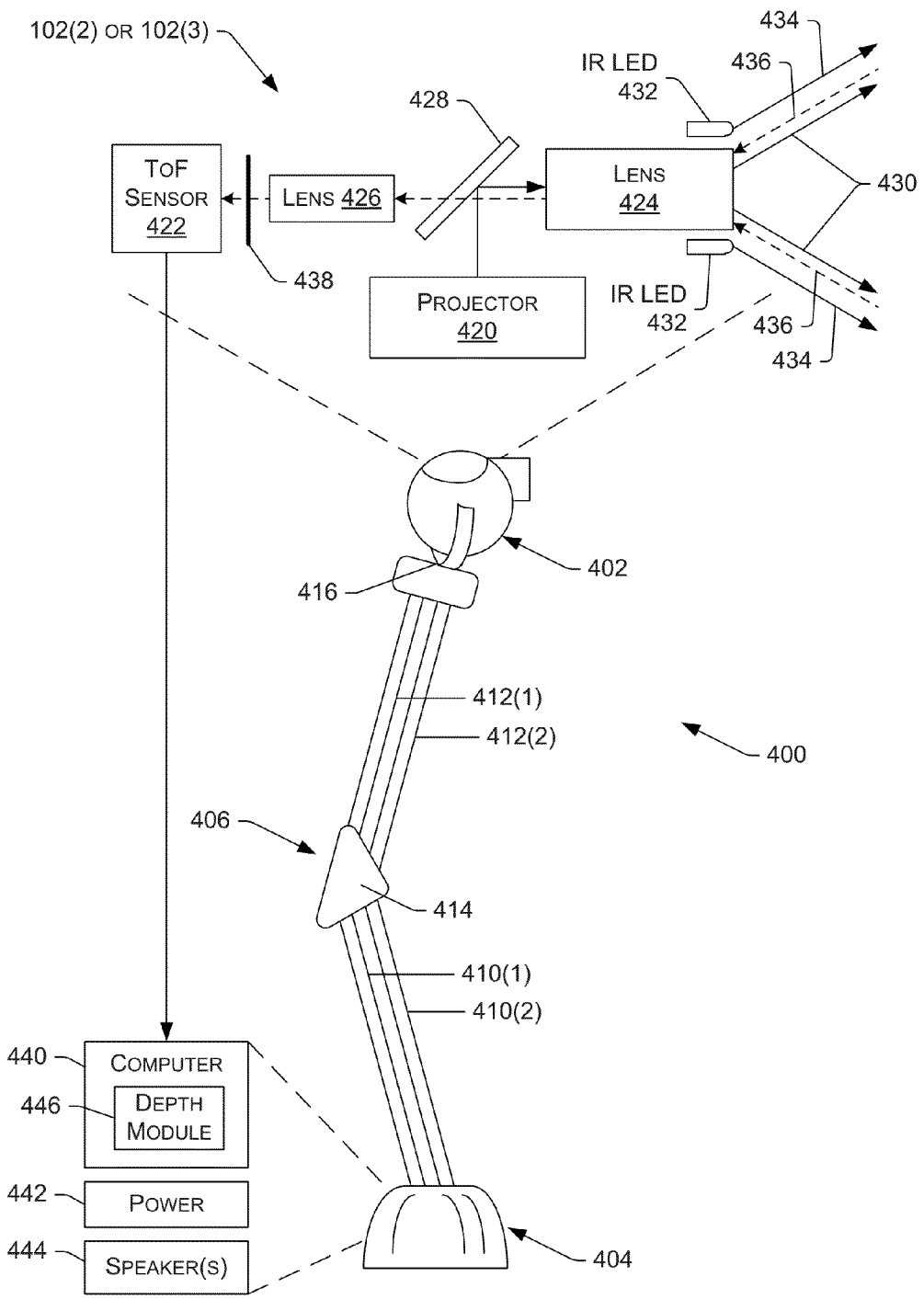
FIG. 4 shows a second implementation of a projection and image capture system formed to resemble a familiar type of furniture, such as a table lamp. In this implementation, the projector and camera share a common optical path through a lens.

FIG. 4 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable arm mechanism 406. As illustrated, the arm mechanism 406 has two base members or rods 410(1) and 410(2) connected to two head members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). The universal connector 416 is described below in more detail with reference to FIG. 7. In other implementations, the head 402 may be mounted to the arm mechanism 406 in a fixed manner, with no movement relative to the arm mechanism 406, or in a manner that enables more or less than two degrees of freedom.

The head 402 holds several components, including a projector 420 and a time of flight (ToF) sensor 422. In this example, the ToF sensor 422 measures IR signal reflections from objects within the scene. The ToF sensor 422 may be implemented as a standalone sensor, or as part of a camera. The head also contains one or more lenses, including a first lens 424 and a second lens 426. The first lens 424 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 424 may further include a motorized focus, a motorized zoom, and a motorized iris.

The second lens 426 is provided to adjust for the differences between the projection imager and the ToF imager. This allows for the device to set relative coverage of the two imagers (e.g., overscan/underscan).

The projector 420 projects an image that is reflected off an angled beam splitter 428 and out through the lens 424. The beam splitter 428 may be, for example, embodied as a dichroic beam splitter having a coated prism assembly that employs dichroic optical coatings to divide light. The projected image has a field of view represented by the outgoing pair of arrows 430. In this manner, the visible and high intensity light from the projector can be zoomed for image projection on a wide range of surfaces, from near view to far view surfaces.

One or more IR emitters 432, such as IR LEDs, are positioned in the head 402 relative to the lens 424. The IR emitters 432 direct IR light in the direction of the projected image to illuminate the scene onto which the images are being projected. The IR emitters 432 may be arranged such that the illumination field is wider than the projected field, as represented by the outgoing pair of arrows 434.

The IR signals are scattered from objects in the scene and returned to the lens 424, as represented by the incoming pair of arrows 436. The captured IR signals are passed through the lens 424 and through the dichroic beam splitter 428 to the secondary lens 326. The IR signals are then optionally passed through an IR filter 438 (or other filter type) to the ToF sensor 422. In other implementations, the IR signals may be passed directly from the lens 426 to the ToF sensor 422, without going through the IR filter 438. Accordingly, the IR signals are emitted out from the head 402, scattered by the objects, and collected by the head 402 for capture by the ToF sensor 422 as a way to image the scene. This technique is performed in lieu of using structured light, as implemented in the implementation of the first ARFN 102(1).

It is noted that, in other implementations, the projector 420 may be arranged to project an image that is passed through the beam splitter 428 and out through the lens 424, rather than being reflected by the beam splitter 428. In this arrangement, the returning IR signals may be received back through the lens 424 and reflected by the beam splitter 428 to the lens 426 and ToF sensor 422. Said another way, the projector 420 and IR components (i.e., ToF sensor 422, lens 426 and optionally filter 438) may be swapped so that the returning IR signals are reflected by the beam splitter 428 rather than the projected image. Other arrangements may also be possible where at least part of the optical path is shared by the projection and depth capture.

The lamp-based ARFN 102(2) or 102(3) may also be equipped with one or more components in the base 404. In this example, a computer 440 resides in the base 404, along with power components 442 and one or more speakers 444. The computer may include processing and memory to execute instructions. A depth module 446 may be executed by the computer 440 to measure a time of flight for an IR signal (or other modulated light output). The time-of-flight value may be derived as a function of a time lapsed between emission from an IR LED 432 and capture by the ToF sensor 422. Alternatively, the time-of-flight value may be derived as a function of the phase difference between the modulated light output and the returned light. The depth module may be implemented in software or hardware. It is noted that in other implementations, the components shown as residing in the base 404 may reside in the head 402 or arm mechanism 406. For instance, the computer 440 may be located in the head, and the speakers may be 444 may be distributed in multiple locations, including the base, arm mechanism, and/or the head.

Notice that in this implementation of FIG. 4, the projector 420 and the sensor 422 share a common optical path through a common lens 424. As a result, the ARFN may be made more compact to a smaller form factor, as one set of lenses are removed in this design as compared to the offset design for FIG. 2.

Illustrative Scenarios

FIGS. 5-9 illustrate various representative scenarios in which the ARFNs project different subject matter onto different surfaces of the projection screen. The scenarios are shown as being performed by various ARFNs 102(1), 102(2), and 102(3), although any one of the scenarios may be facilitated by any one of the ARFNs, or other devices that have projector and computing capabilities. Further, these are merely representative of a vast number of scenarios that may be performed by projecting different subject matter on different surfaces of a multi-surface projection screen.

Figure 5:
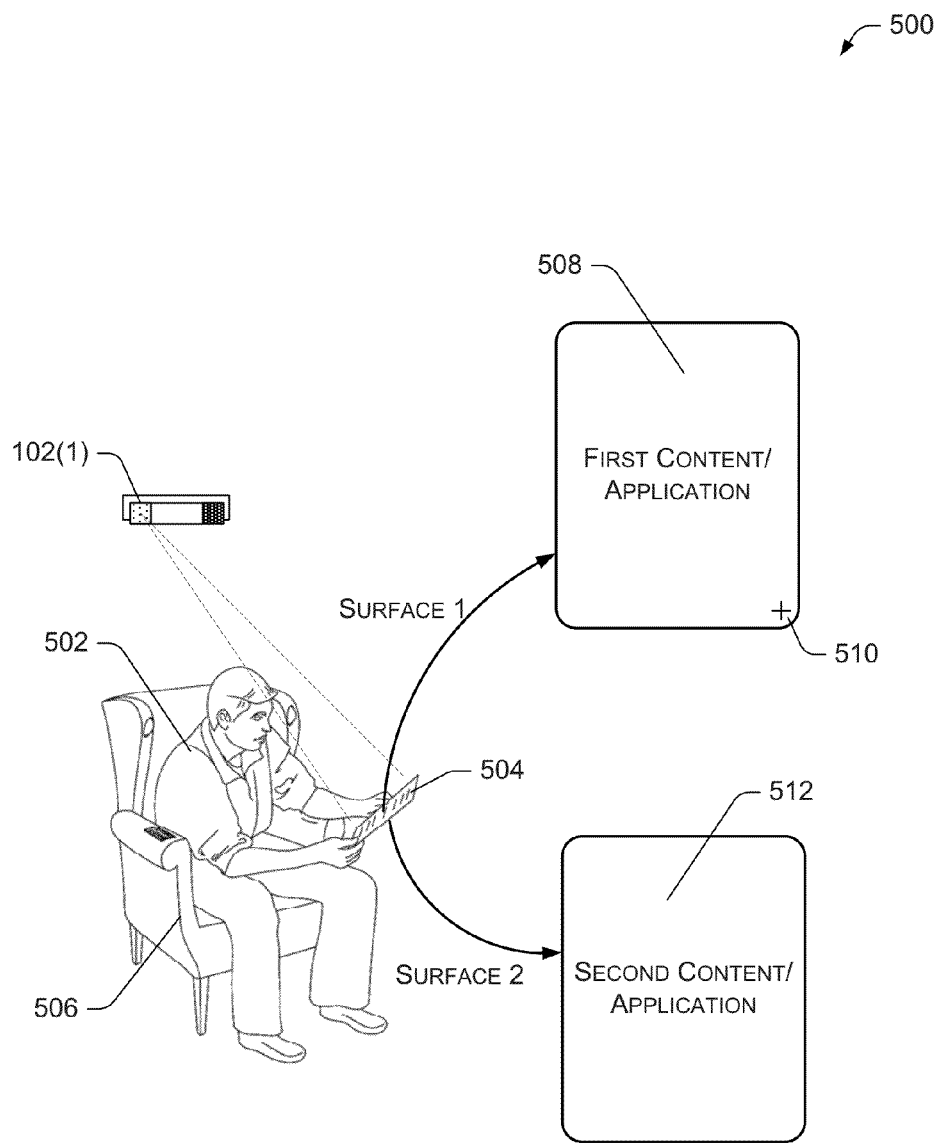
FIG. 5 illustrates a portable passive projection screen having at least two surfaces, wherein the projection and image capture system projects different content and/or applications depending upon which surface of the projection screen is exposed to receive projected images.

FIG. 5 illustrates a user scenario 500 in which a viewer 502 is holding a two-surface portable passive projection screen 504. The viewer is shown sitting in a chair 506, although the user may also be mobile, such as walking around a room or down a hall. The viewer 502 is looking at the first side or surface 508 of the screen 504. The first surface 508 facilitates viewing of images projected by the projector of ARFN 102 that, when projected, present subject matter such as content or an application. The first surface 508 may have a distinctive or discernible feature that the ARFN 102(1) can detect when the surface is oriented to receive images projected from the ARFN 102(1). For instance, the camera of the ARFN 102(1) may optically detect different features on the surface, such as a registration mark 510. However, essentially any optically detectable indicia may be used, such as color, surface type, shape, finish, and so forth. Alternatively, electronic components mounted in the screen 504 may be used to provide orientation or position data to the ARFN 102(1) for use in detection which surface is upward facing.

The viewer 502 may flip the screen 504 so that a second side or surface 512 is exposed to the projector of the ARFN 102(1). The second side 512 facilitates viewing of images projected by the projector of ARFN 102(1) that, when projected, present other content or another application that is different from that projected when the first surface is facing the projector. The second surface 512 may also have a distinctive or discernible feature that the ARFN 102(1) can detect when the surface is oriented to receive images projected from the ARFN 102(1). As above, these features may include essentially any optically detectable indicia, such as registration marks, color, surface type, shape, finish, and so forth.

The computer of the ARFN 102(1) switches between subject matter to be projected upon detecting a change between the first and second surfaces. To the user, the experience of switching between different content or different applications is as simple as turning the screen over in his or her hands. As soon as the user holds the first surface 508 upward toward the projector, the ARFN 102(1) detects the first surface 508 and the computer outputs for projection the content or application associated with that first surface. When the user flips the screen 504 over to expose the second surface, the ARFN 102(1) detects the second surface 512 and the computer switches to output the other content or application for projection onto the second surface. Accordingly, the portable projection screen 504 may be used to view different content or applications simply by flipping the screen to expose a different surface. FIGS. 6-9 show representative examples of content or applications.

Figure 6:
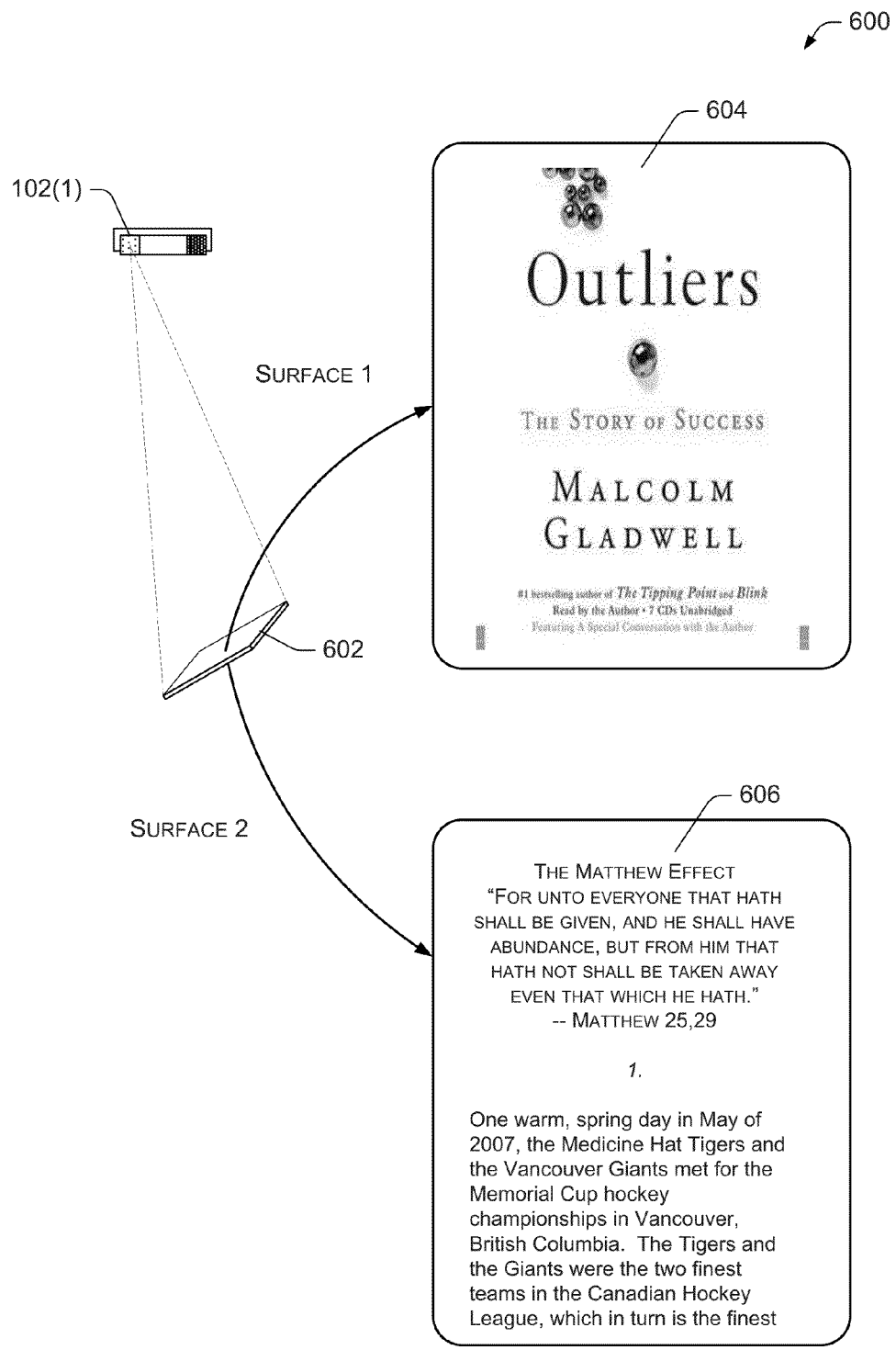
FIG. 6 shows an example scenario of using the projection and image capture system of FIG. 2 together with a two-surface projection screen to present different content on the two surfaces of the projection screen.

FIG. 6 shows an example scenario 600 of using the ARFN 102(1) together with a two-surface projection screen 602 to present different content on the two sides of the projection screen. In this example, the ARFN 102(1) is projecting content from an electronic book, such as the popular book "Outliers" by Malcolm Gladwell. When the first surface 604 of the screen 602 is oriented toward the projector of ARFN 102(1), a first portion of the eBook is projected onto the surface. In this example, cover page of the eBook is projected onto the surface to identify the currently selected book. It could also be a first location within the book, a table of contents, an index, or appendix of the book.

When the user flips the screen 602 to expose a second surface 606, a second portion of the eBook is projected onto the surface. In this example, chapter 1 of the book is projected onto the surface 606 as the current location that the user is reading. The user may turn pages through any number of user interface techniques that are detectable by the ARFN 102(1), such as gestures, voice commands, and so forth.

Figure 7:
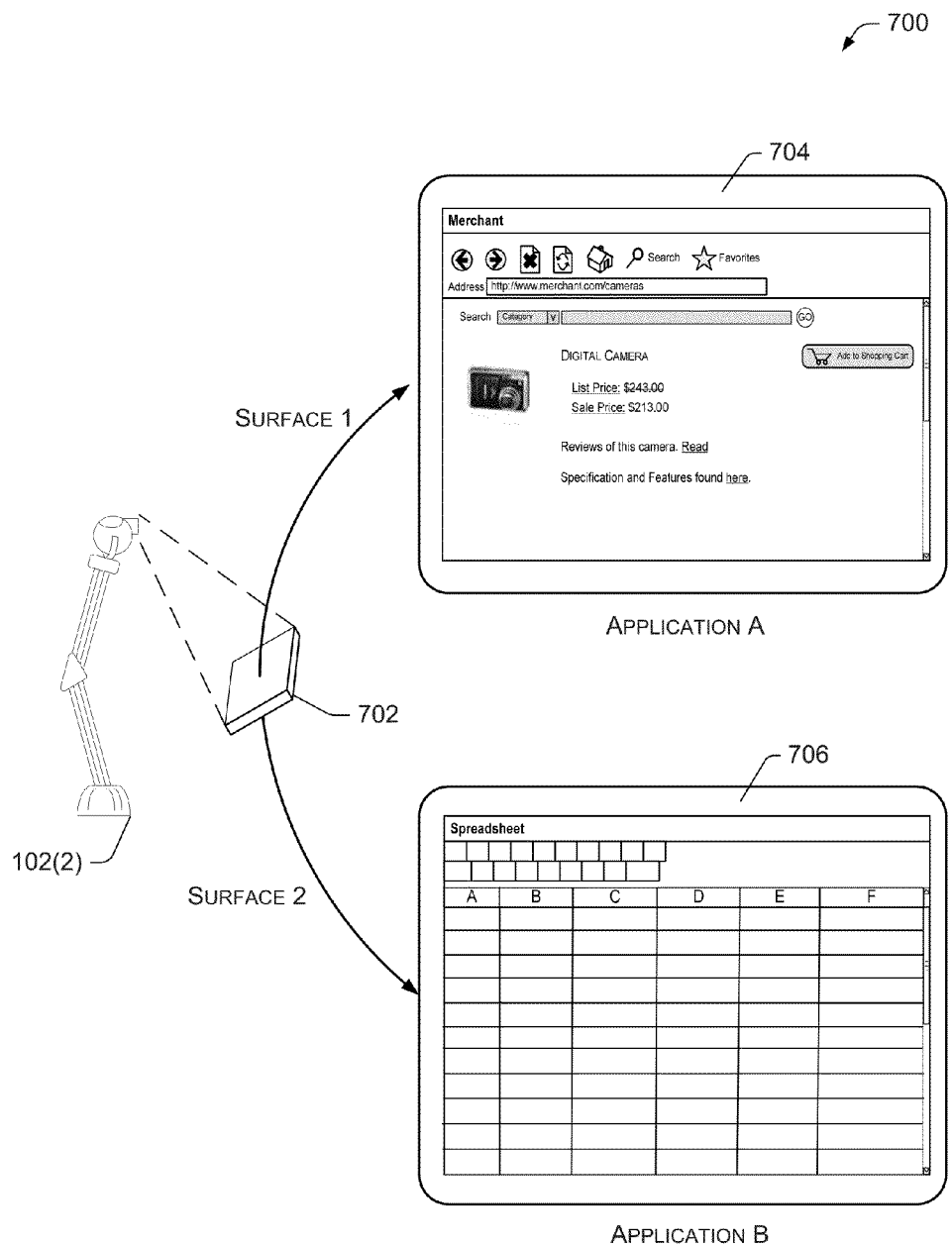
FIG. 7 shows an example scenario of using the projection and image capture system of FIG. 4 together with a two-surface projection screen to present different applications on the two surfaces of the projection screen.

FIG. 7 shows an example scenario 700 of using the ARFN 102(2) together with a two-surface projection screen 702 to present different applications on the two sides of the projection screen. In this example, the projection screen 702 is held in a landscape orientation. When a first surface 704 of the screen 702 is oriented toward the projector of ARFN 102(2), a first application A is projected onto the surface. In this example, an e-commerce application is rendered in a browser and projected onto the first surface 704.

When the screen 702 is turned over to expose a second surface 706, a second application B is projected onto the surface. In this example, the application B is a spreadsheet application. The user may interact with the applications through any type of user interface, including touch, gestures, voice commands, and so forth.

While an e-commerce application and the spreadsheet application are illustrated, essentially any application suitable for projection may be employed. Further, in an alternative to changing between applications, the change triggered by turning over the screen may be between two different graphical windows of the same application. For instance, when an email program is projected, one surface may present the inbox of the email program and the other surface may present, for example, an individual email or a settings user interface that allows the user to change filter characteristics for the inbox.

Figure 8:
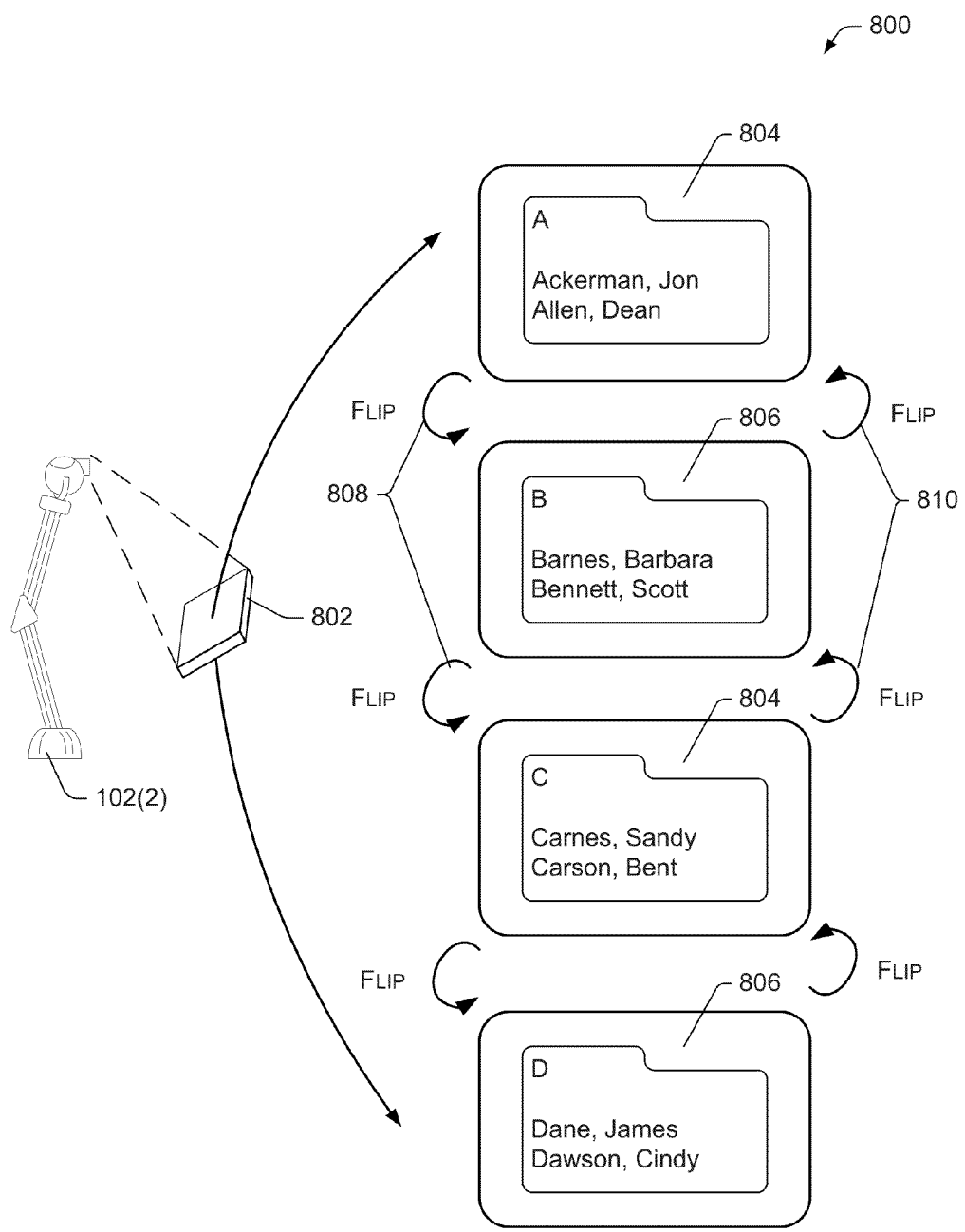
FIG. 8 shows another example scenario of using the projection and image capture system of FIG. 4 to present different images as the user turns the projection screen over and over in a continuous direction.

FIG. 8 shows another example scenario 800 of using the ARFN 102(2) together with a two-surface projection screen 802 in which the user turns the projection screen 802 over and over in a continuous pattern to advance content in an intuitive manner. In this example, the ARFN 102(2) is projecting an address book application which maintains and organizes contact information. When the user holds a front surface 804 toward the projector of the ARFN 102(2), the application outputs the contacts having a last name beginning with the letter "A". The user can flip the screen over to the back surface 806 in a first direction (as represented by arrows 808) and in response, the application advances to the contacts with a last name beginning with the letter "B". If the user continues to flip the screen in the same direction 808 to alternately expose the front surface 804 and the back surface 806, the application continues to logically advance through the "C" group of contacts, "D" group of contacts, and so on. However, if user were to flip the screen 802 back to alternately expose the front surface 804 and the back surface 806 in an opposite direction (as represented by arrows 810), the application would progress sequentially back through the contacts of groups "D", "C", "B", and "A".

While an application is illustrated for discussion purposes, other types of content may take advantage of this pattern of turning. For instance, the ARFN 102(2) may project an eBook onto the screen 802, and the act of turning the screen 802 over and over results in turning the pages of the eBook.

In another variation, the projection screen may be embodied as a flip pad with multiple sheets attached at one end to enable the user to flip through the various sheets. In this arrangement, each sheet effectively defines two surfaces onto which different images can be projected. The projection system detects the various surfaces of the sheets on the flip pad, and changes the content/applications for each surface as the user flips through the sheets. In this way, the screen offers more than two projection surfaces. Still another example of multiple projection surfaces is described next with reference to FIG. 9.

Figure 9:
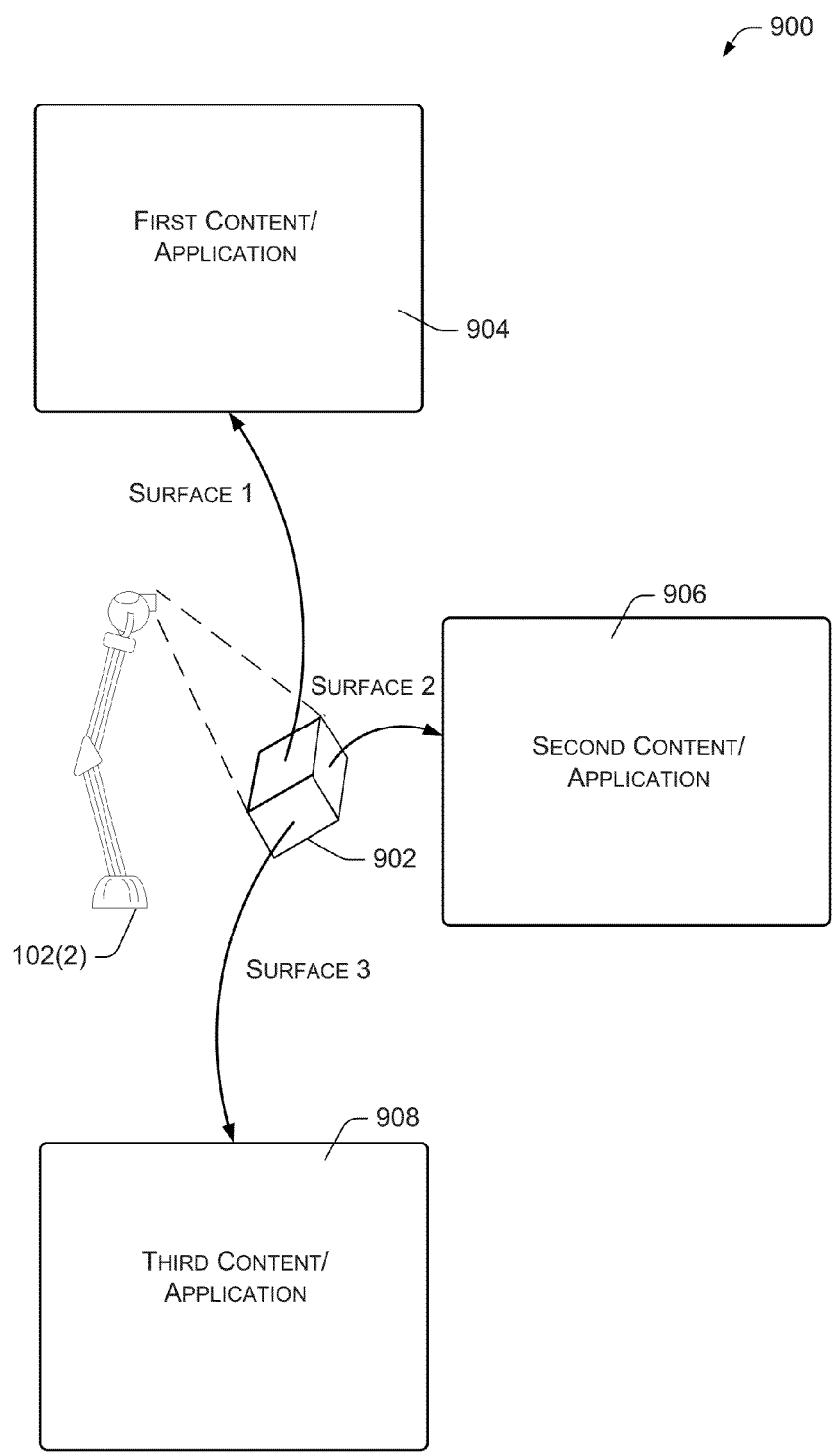
FIG. 9 shows an example scenario of using the projection and image capture system of FIG. 4 together with a multi-surface projection screen to present different content and/or applications on each of the multiple sides.

FIG. 9 shows yet another example scenario 900 involving an ARFN 102(2) and a projection screen 902. In this example, the projection screen has more than two projection surfaces. There are many ways to implement a multi-surface projection screen, and FIG. 9 illustrates a cube-like screen having six projection surfaces, three of which are shown for discussion purposes. Each surface is independently identifiable by the ARFN 102(2) so that different images conveying different content or applications may be projected onto associated surfaces.

In this scenario 900, the ARFN 102(2) projects images of first content or a first application onto the first surface 904. When the user turns the cube-like screen 902 to expose a second surface 906, the ARFN 102(2) detects this change and in response, projects second content or a second application onto the second surface 906. When the user turns the cube-like screen 902 to expose a third surface 908, the ARFN 102(2) detects this change and in response, projects third content or a third application onto the third surface 906.

Figure 10:
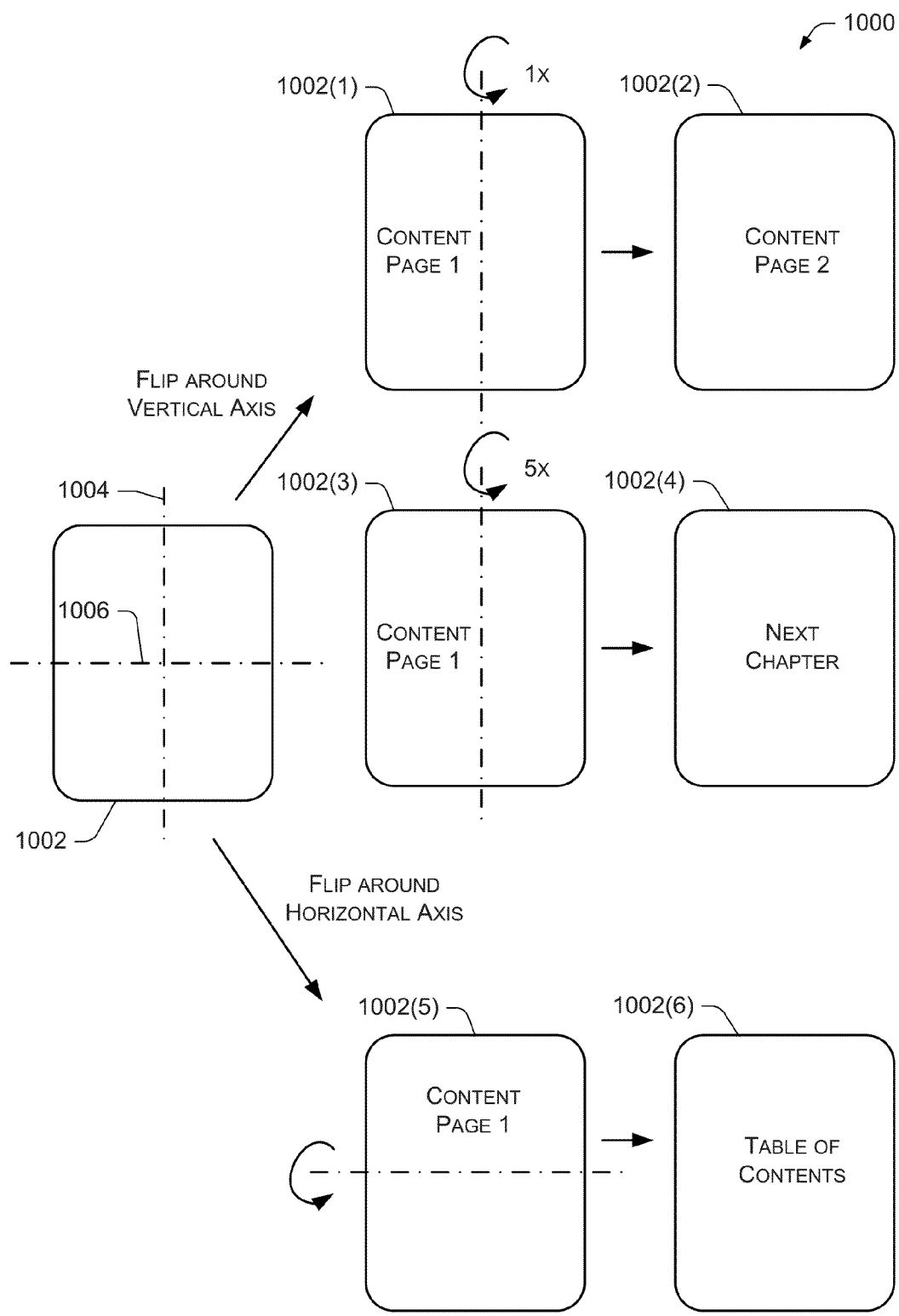
FIG. 10 shows still another example scenario of using the projection and image capture system to present different images depending upon how the user flips the projection screen, such as which axis or the velocity at which the screen is turned.

FIG. 10 shows still another example scenario 1000 of involving an ARFN (not shown) and a projection screen 1002. In this example, the projection screen has two projection surfaces and the images presented thereon depend upon how the user flips the projection screen. For instance, suppose the screen 1002 has two primary axes: a vertical axis 1004 and a horizontal axis 1006. The user may elect to flip the screen 1002 about the vertical axis as illustrated by the scenarios in the upper right hand portion of FIG. 10. At screen instance 1002(1), where a first surface is exposed, a first image is projected thereon, such as content from page 1 of a book. When the user turns the screen over around the vertical axis to screen instance 1002(2), where the second surface is exposed, new content is projected thereon, such as content from page 2 of the book.

Another factor that may be taken into account is the velocity at which the screen is turned. For example, suppose the projection screen is flipped around the vertical axis 1004 at a first speed (e.g., 1×) to maintain a sequence of images, such as turning pages of a book as shown in the instances 1002(1) and 1002(2). Now, suppose that the user flips the screen much faster (e.g., 5×). This is illustrated by the transition from screen instance 1002(3) to 1002(4). In this case, the projection system changes the sequence of images to provide an entirely different result than had the user turned the screen at a normal rate. In the book example, the faster flipping may be configured as a signal to jump ahead by chapters, rather than to the next page, as illustrated by the transition from instance 1002(3) to instance 1002(4).

The velocity of flipping the screen may be determined in multiple ways. In one approach, images captured of the user turning the screen over may be analyzed to predict the speed of rotation. In another approach, the screen may be equipped with an accelerometer or other active component that wirelessly provides velocity information to the projection system.

As also illustrated in FIG. 10, the user may elect to flip the screen 1002 about the vertical axis as illustrated by the scenarios in the lower right hand portion of FIG. 10. At screen instance 1002(5), where a first surface is exposed, a first image is projected thereon, such as content from page 1 of a book. When the user turns the screen over around the horizontal axis 1006 to screen instance 1002(6), where the second surface is exposed, the projection system projects images of another part of the book, such as the table of contents, or to an entirely different set of content or application. In this manner, the user can turn pages by flipping the screen about the vertical axis 1004 or go to the table of contents by flipping the screen about the horizontal axis. As above, the velocity at which the user turns the screen about the horizontal axis may also be used to help determine what content is presented on the next surface.

Illustrative Process

Figure 11:
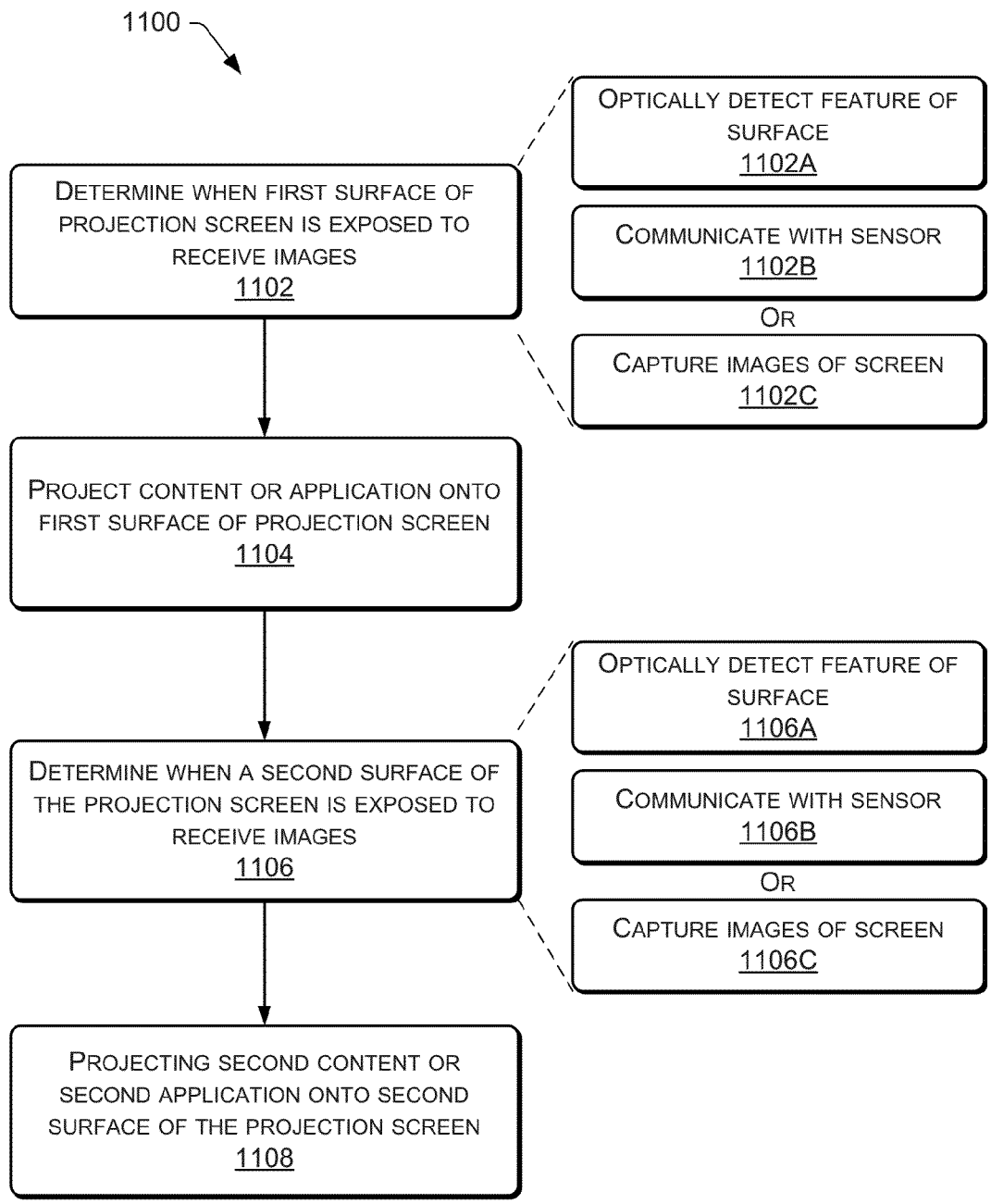
FIG. 11 shows an illustrative process of using a projection and camera system in an augmented reality environment to project different content and/or applications onto different surfaces of a multi-surface projection screen.

FIG. 11 shows an illustrative process 1100 of using a projection and camera system in an augmented reality environment to project different content and/or applications onto different surfaces of a multi-surface projection screen. The process described below may be implemented by the architectures described herein, or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 1102, the process determines that a first surface of the projection screen is oriented to receive images from a projector, such as the projector in an ARFN 102. The determination may be made in a number of ways. A first approach, represented at 1102A, is to optically detect a feature of the surface. This feature may be a color, surface type, finish, shape, registration mark, and so forth. A second approach, represented at 1102B, is to communicate with a sensor on the screen to sense orientation and/or position, and from this data determine which surface is facing the projector. A third technique, represented at 1102C, is to capture images of the environment and determine, from those images, when the user has positioned a particular surface to receive projected images.

At 1104, first content or a first application is projected onto the first surface of the projection screen. Once the ARFN determines that the first surface is exposed, the ARFN projects the subject matter associated with that surface.

At 1106, it is determined when a second surface of the projection screen is exposed to receive images from a projector, such as the projector in an ARFN 102. As above, this determination may be made in a number of ways, including by optically detecting a feature of the surface at 1106A. This feature may be a color, surface type, finish, shape, registration mark, and so forth. A second approach, represented at 1106B, is to communicate with a sensor on the screen to sense orientation and/or position, and from this data determine which surface is facing the projector. A third technique, represented at 1106C, is to capture images of the environment and determine, from those images, when the user has positioned a particular surface to receive projected images.

At 1108, second content or a second application is projected onto the second surface of the projection screen. Once the ARFN determines that the second surface is exposed, the ARFN projects the subject matter associated with that surface.

In this manner, the methodology enabled by the projection and camera system allows for projection of different subject matter onto different surfaces of a projection screen dependent upon which surface is oriented to receive the projected images.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a projection screen to present images projected thereon, the projection screen having at least a first surface and a second surface;
a projection system comprising:
    a memory;
    a processor;
    a projector;
    a surface detection component to:
        determine a first rate at which the projection screen is adjusted such that the first surface is oriented towards the projector; and
        determine a second rate at which the projection screen is adjusted such that the second surface is oriented towards the projector, the second rate being different from the first rate; and
    the projector to:
        project one or more first images onto the first surface of the projection screen based at least in part on the first rate; and
        project one or more second images onto the second surface of the projection screen based at least in part on the second rate, wherein the one or more first images projected onto the first surface present first content and the one or more second images projected onto the second surface present second content different from the first content.

2. The system of claim 1, wherein the projection screen comprises a handheld, passive projection screen.

3. The system of claim 1, wherein the first surface of the projection screen differs from the second surface of the projection screen.

4. The system of claim 1, wherein the first surface and the second surface of the projection screen are at least one of different colors, different finishes, or different shapes.

5. The system of claim 1, wherein the projection screen comprises an electronic component to provide data indicative of a position or an orientation of the projection screen.

6. The system of claim 5, wherein the surface detection component is configured to communicate with the electronic component of the projection screen to determine whether the first surface or the second surface of the projection screen is oriented toward the projector.

7. The system of claim 1, further comprising:
a camera to capture one or more images of the projection screen; and
the surface detection component is configured to determine whether the first surface or the second surface of the projection screen is oriented toward the projector based at least in part on at least one of the one or more first images or the one or more second images.

8. The system of claim 1, wherein the projection screen comprises at least three surfaces.

9. The system of claim 1, wherein the first content is a first application and the second content is a second application different from the first application.

10. The system of claim 1, wherein the surface detection component is configured to detect a rotation of the projection screen from the first surface to the second surface, and in response to detecting the rotation of the projection screen from the first surface to the second surface, the projector changes from projecting the one or more first images onto the first surface to projecting the one or more second images onto the second surface.

11. A system comprising:
a projection screen having at least a first surface and a second surface; and
a projection system to:
detect a first rate at which a position of the projection screen is adjusted such that the first surface is oriented towards the projection system;
based at least partly on the first rate, project one or more first images onto the first surface of the projection screen;
detect a second rate at which the projection is adjusted such that the second surface is oriented towards the projection system, the second rate being different from the first rate; and
project one or more second images onto the second surface of the projection screen based at least in part on the second rate.

12. The system of claim 11, wherein the projection screen comprises a passive display screen.

13. The system of claim 11, wherein the projection screen comprises at least three surfaces.

14. The system of claim 11, wherein the first surface and the second surface of the projection screen are at least one of different surface types, different colors, different shapes, or different finishes.

15. The system of claim 11, wherein the projection system comprises a camera to optically detect which of the first surface or the second surface of the projection screen is oriented toward the projection system.

16. The system of claim 11, wherein the projection system is configured to detect when a user turns the projection screen to change which of the first surface or the second surface is oriented toward the projection system, and in response, to switch between projecting the one or more first images onto the first surface and the one or more second images onto the second surface depending upon which of the first surface or the second surface is oriented toward the projection system.

17. A projection system comprising:
a projector;
a surface detection component to;
detect a first rate at which a projection screen is adjusted such that a first surface of the projection screen is oriented towards the projector; and
detect a second rate at which the projection screen is adjusted such that a second surface of the projection screen is oriented towards the projector; and
the projector to:
project one or more first images onto the first surface of the projection screen based at least in part on the first rate; and
project one or more second images onto the second surface of the projection screen based at least in part on the second rate.

18. The projection system of claim 17, wherein the one or more first images correspond to a first application and the one or more second images correspond to a second application different from the first application.

19. The projection system of claim 17, further comprising:
a camera to capture one or more images of the projection screen; and
the surface detection component is configured to determine whether the first surface or the second surface of the projection screen is oriented toward the projector based at least in part on at least one of the one or more first images or the one or more second images.

20. The projection system of claim 17, wherein the surface detection component detects a rotation of the projection screen from the first surface to the second surface, and in response to detecting the rotation of the projection screen from the first surface to the second surface, the projector changes from projecting the one or more first images onto the first surface to projecting the one or more second images onto the second surface.

21. A method comprising:
projecting, from a projector, one or more first images onto a first surface of a projection screen;
determining a rate at which the projection screen is moved in a first direction relative to the projector to expose a second surface to the projector; and
projecting, from the projector and based at least partly on the rate, one or more second images onto the second surface of the projection screen.

22. The method of claim 21, wherein the one or more first images projected onto the first surface present first content and the one or more second images projected onto the second surface present second content different from the first content.

23. The method of claim 21, wherein the one or more first images projected onto the first surface present a first application and the one or more second images projected onto the second surface present a second application different from the first application.

24. The method of claim 21, wherein the determining comprises optically sensing which of the first surface or the second surface is exposed.

25. The method of claim 21, wherein the first surface is different than the second surface, and the determining comprises detecting which of the first surface or the second surface is exposed based at least in part on a difference between the first surface and the second surface.

26. The method of claim 21, wherein the projection screen comprises an electronic component to provide data indicative of position or orientation of the projection screen, and the determining comprises detecting which of the first surface or the second surface is exposed based at least in part on the data from the electronic component.

27. The method of claim 21, further comprising:
- determining that the projection screen is moved to expose a third surface to the projector; and
- projecting, from the projector, one or more third images onto the third surface of the projection screen.

28. The method of claim 21, further comprising:
- determining that the projection screen is moved from the second surface of the projection screen to expose the first surface to the projection screen; and
- projecting, from the projector, the one or more first images onto the first surface of the projection screen.

* * * * *